US012628811B2

(12) United States Patent
Philipsen et al.

(10) Patent No.: US 12,628,811 B2
(45) Date of Patent: May 19, 2026

(54) SPOT WEED DETECTION AND TREATMENT WITHIN A FIELD OF VIEW IN ACCORDANCE WITH MACHINE LEARNING TRAINING

(71) Applicant: Spraying Systems Co., Wheaton, IL (US)

(72) Inventors: Mark Philip Philipsen, Dybvad (DK); Hendrik A. Van Den Bulcke, Merelbeke (BE); Jan Emma Louis Anthonis, Haasrode (BE)

(73) Assignee: Spraying Systems Co., Wheaton, IL (US)

( * ) Notice: Subject to any disclaimer, the term of this patent is extended or adjusted under 35 U.S.C. 154(b) by 339 days.

(21) Appl. No.: 18/231,352

(22) Filed: Aug. 8, 2023

(65) Prior Publication Data
US 2024/0196879 A1     Jun. 20, 2024

Related U.S. Application Data

(60) Provisional application No. 63/433,101, filed on Dec. 16, 2022.

(51) Int. Cl.
*A01M 21/04*          (2006.01)
*G06V 10/22*          (2022.01)
(Continued)

(52) U.S. Cl.
CPC ........... *A01M 21/043* (2013.01); *G06V 10/22* (2022.01); *G06V 10/764* (2022.01);
(Continued)

(58) Field of Classification Search
CPC ... A01M 21/043; G06V 10/82; G06V 20/188; G06V 10/22; G06V 10/774; G06V 10/776; G06V 10/764
See application file for complete search history.

(56) References Cited

U.S. PATENT DOCUMENTS

| | | | | |
|---|---|---|---|---|
| 5,606,821 A | * | 3/1997 | Sadjadi | A01M 7/0089 |
| | | | | 47/1.01 R |
| 10,441,965 B2 | * | 10/2019 | Feldhaus | B05B 1/20 |

(Continued)

FOREIGN PATENT DOCUMENTS

| | | | | |
|---|---|---|---|---|
| CA | 3140955 A1 | * | 11/2020 | G06Q 50/20 |
| CN | 102172233 A | * | 9/2011 | A01M 7/00 |

(Continued)

OTHER PUBLICATIONS

International Bureau, International Search Report in International Application No. PCT/US2023/029695, mailed Nov. 15, 2023.
(Continued)

*Primary Examiner* — Manav Seth
(74) *Attorney, Agent, or Firm* — Leydig, Voit & Mayer, Ltd.

(57) ABSTRACT
A weed spot-spraying system is described for carrying out a spot-based weed spraying method based upon a classification value rendered from a sub-field image in accordance with a machine learning-based trained model applied by a processor to the sub-field image. The system includes a camera; a spray nozzle assembly including a spray nozzle; and a processor. The method carried out by the system includes acquiring, by the camera, a full field of view image of a crop floor. The method further includes extracting, from the full field of view image, a sub-field image corresponding to the spray nozzle positioned to provide a spray field extending over a part of the crop floor depicted in the sub-field image; rendering, by the processor in accordance with the machine learning-based trained model, a classification for the sub-field image; and selectively activating the spray nozzle in accordance with the classification for the sub-field image.

20 Claims, 4 Drawing Sheets

(51) Int. Cl.

| | |
|---|---|
| *G06V 10/764* | (2022.01) |
| *G06V 10/774* | (2022.01) |
| *G06V 10/776* | (2022.01) |
| *G06V 10/82* | (2022.01) |
| *G06V 20/10* | (2022.01) |

(52) U.S. Cl.
CPC .......... *G06V 10/774* (2022.01); *G06V 10/776* (2022.01); *G06V 10/82* (2022.01); *G06V 20/188* (2022.01)

(56) References Cited

U.S. PATENT DOCUMENTS

| | | | | |
|---|---|---|---|---|
| 10,491,879 | B2 | 11/2019 | Redden | |
| 10,721,859 | B2 * | 7/2020 | Wu | A01C 21/005 |
| 10,803,311 | B2 * | 10/2020 | Halligan | A01M 7/0089 |
| 10,812,776 | B2 | 10/2020 | Redden | |
| 11,023,726 | B2 | 6/2021 | Halligan et al. | |
| 11,093,745 | B2 | 8/2021 | Redden et al. | |
| 11,367,207 | B2 | 6/2022 | Fu et al. | |
| 11,393,049 | B2 * | 7/2022 | Khait | G06N 20/00 |
| 11,425,354 | B2 | 8/2022 | Redden | |
| 12,310,272 | B2 * | 5/2025 | Sibley | A01B 69/004 |
| 2014/0001276 | A1 * | 1/2014 | Joergensen | A01M 21/043 |
| | | | | 239/69 |
| 2016/0310978 | A1 * | 10/2016 | Bittner | A01M 7/0089 |
| 2021/0090274 | A1 * | 3/2021 | Fu | A01C 23/02 |
| 2021/0386051 | A1 * | 12/2021 | Seitz | A01M 7/0089 |
| 2022/0248657 | A1 | 8/2022 | Garner et al. | |
| 2022/0358456 | A1 * | 11/2022 | Rafidi | G06N 20/00 |
| 2023/0247928 | A1 * | 8/2023 | Sibley | G06V 10/774 |
| | | | | 701/50 |
| 2024/0032525 | A1 * | 2/2024 | Petro | G06V 20/56 |

FOREIGN PATENT DOCUMENTS

| | | | | | |
|---|---|---|---|---|---|
| EP | | 3741214 | A1 * | 11/2020 | G06Q 50/02 |
| EP | | 3832524 | A1 * | 6/2021 | G06V 20/70 |
| WO | WO-2012122988 | A1 * | | 9/2012 | A01M 21/043 |
| WO | WO-2019110583 | A1 * | | 6/2019 | G06V 20/698 |
| WO | WO 2021/110476 | A1 | | 6/2021 | |
| WO | WO-2021216637 | A1 * | | 10/2021 | G06T 3/4038 |
| WO | WO-2023118326 | A1 * | | 6/2023 | A01M 7/0089 |
| WO | WO-2023150023 | A1 * | | 8/2023 | G06V 10/774 |

OTHER PUBLICATIONS

Zhang Wenhao, et al, Broad-Leaf Weed Detection in Pasture, 2018 IEEE 3$^{rd}$ International Conference on Image, Vision and Computing (ICOVC, IEEE, Jun. 27, 2018), pp. 101-105.

Brendan Calvert et al., "Robotic Spot Spraying of Harrisia Cactus (*Harrisia martinii*) in Grazing Pastures of the Australian Rangelands," Plants 2021, 10, 2054, pp. 1-18, https://doi.org/10.3390/plants10102054.

Kun Hu et al., Deep learning techniques for in-crop weed recognition in large-scale grain production systems: a review, Review, Precision Agriculture (2024) 25, pp. 1-29, https://doi.org/10.1007/s11119-023-10073-1.

Alex Olsen et al., "DeepWeeds: A Multiclass Weed Species Image Dataset for Deep Learning," Scientific Reports, (2019) 9:2058, pp. 1-12, https://doi.org/10.1038/s41598-018-38343-3.

Jiayao Zhuang et al., "Evaluation of Different Deep Convolutional Neural Networks for Detection of Broadleaf Weed Seedlings in Wheat," Research Article, © 2021 Society of Chemical Industry, Pest Manag Sci 2022; 78: pp. 521-529.

Mostafa Rahimi Azghadi et al., "Precision Robotic Spot-Spraying: Reducing Herbicide Use and Enhancing Environmental Outcomes in Sugarcane," Apr. 21, 2025, pp. 1-36, College of Science and Engineering, James Cook University, QLD, Australia, Agriculture Technology and Adoption Centre, James Cook University, QLD, Australia.

Feng Yu, "Progress in the Application of CNN-Based Image Classification and Recognition in Whole Crop Growth Cycles," Remote Sens. 2023, 15, 2988, pp. 1-25, https://doi.org/10.3390/rs15122988.

Honghua Jiang et al., "CNN Feature Based Graph Convolutional Network for Weed and Crop Recognition in Smart Farming," Computers and Electronics in Agriculture, vol. 174, Jul. 2020, 105450, pp. 1-8.

* cited by examiner

SPOT WEED DETECTION AND TREATMENT WITHIN A FIELD OF VIEW IN ACCORDANCE WITH MACHINE LEARNING TRAINING

CROSS-REFERENCE TO RELATED APPLICATIONS

This patent application is a Non-provisional of U.S. Provisional Application No. 63/433,101, "SPOT WEED DETECTION AND TREATMENT WITHIN A FIELD OF VIEW IN ACCORDANCE WITH MACHINE LEARNING TRAINING", filed Dec. 16, 2022, the contents of which are expressly incorporated by reference in their entirety, including any references contained therein.

TECHNOLOGICAL AREA

The present invention relates generally to agricultural spot spraying arrangements that rely upon machine learning. More particularly, the present disclosure relates to systems for selectively spraying within a single spray nozzle field in response to machine learning-guided classification of an image field corresponding the single spray nozzle field.

BACKGROUND

Considerable effort has been dedicated to reducing the quantity of herbicides on crops. One way in which such reduction is being implemented is by using spot-spraying, as opposed to broadcast spray coverage of herbicides. Moreover, automated spot spraying systems are presently under development that involve training artificial intelligence to recognize when a weed is within a field of view and then activating a spot spraying nozzle to spray the detected weed. Importantly, known artificial intelligence-based systems rely upon identification of a weed image pattern within a camera field of view, which relies upon complex graphical image pattern recognition, within a given image acquired by a camera. Such pattern recognition is potentially very complex, and involves complex processing of captured images (e.g. rotation) as well as the provision of a variety of potential optical patterns corresponding to a variety of weed types to be detected.

Automated/machine learning-based spot spray weeding systems face a number of challenges to operating at a high level of performance. A first challenge is training such systems to accurately detect any of a variety of types and sizes of weeds under a wide variety of operating environments (e.g. time of day, wet/dry ground, light/dark soil, etc.). A need exists to have sufficient examples to effectively train such systems. As a result, both a large variety of views as well as multiple instances of even similar views are needed to ensure accurate automated weed detection.

A further challenge is to ensure that a system operates in a cooperative manner between the weed detection and subsequent triggering/release of herbicide upon the detected weed. For example, if a system takes too long to process a given image, then the farm implement carrying a spray nozzle through which herbicide is to be displayed must be slowed or stopped to ensure a weed does not leave a corresponding herbicide spray nozzle field before the system is able to activate the spray nozzle to treat the detected weed with herbicide.

Providing/operating automated weed detection and spot spraying systems is a challenging task. The number of provided/classified images that are needed to effectively train such systems to accurately identify weeds may exceed a million images. Moreover, effective image data parameterization and analysis is needed to render near-instantaneous decisions on input real-time image data.

SUMMARY OF THE DISCLOSURE

A weed spot-spraying system is described herein that is configured to carry out a spot-based weed spraying method based upon a classification value rendered from a sub-field image in accordance with a machine learning-based trained model applied by a processor to the sub-field image. The system includes a camera, a spray nozzle assembly including a spray nozzle; and a processor that cooperatively operate to carry out a spot-based weed spraying method. Such method includes acquiring, by the camera, a full field of view image of a crop floor. The method further includes extracting, from the full field of view image, a sub-field image corresponding to the spray nozzle positioned to provide a spray field extending over a part of the crop floor depicted in the sub-field image. The processor renders, in accordance with the machine learning-based trained model, a classification for the sub-field image. The method additionally includes selectively activating the spray nozzle in accordance with the classification for the sub-field image.

BRIEF DESCRIPTION OF THE DRAWINGS

While the appended claims set forth the features of the present invention with particularity, the invention and its advantages are best understood from the following detailed description taken in conjunction with the accompanying drawings, of which:

Figure 1:
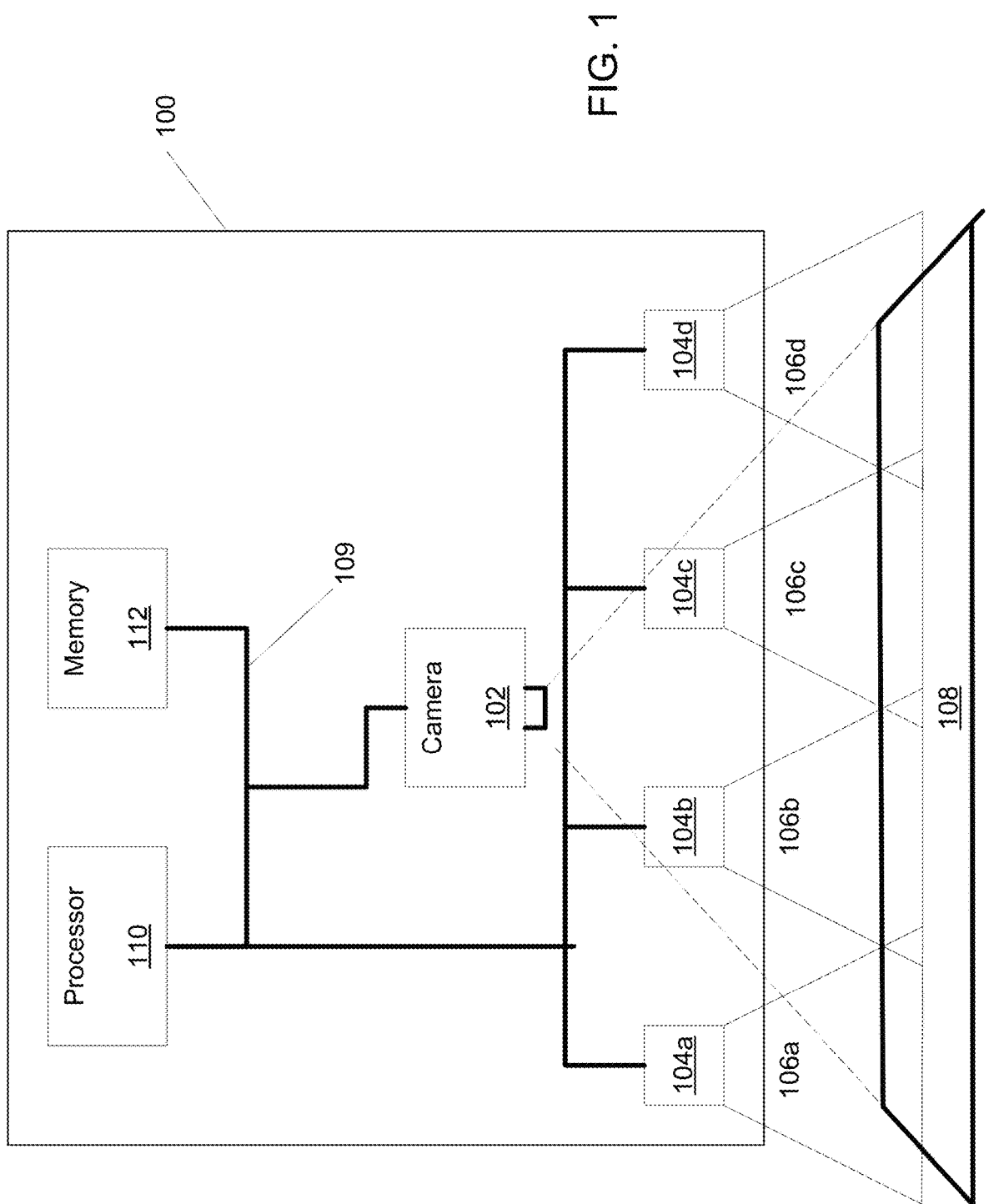
FIG. 1 is a schematic block diagram of an exemplary system arrangement for carrying out an illustrative example of the invention in accordance with the disclosure.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION

Illustrative examples are now described that address the need to provide robust and dynamic machine learning-based identification of weeds in the context of a spot-weeding application. Moreover, the teachings of a machine learning-trained characterization processor that issues output values for an entire field of view of interest—as opposed to identifying a particular visual feature within the field of view of interest—may be applied to any of a number of treatable crop field conditions including, for example, insect infestations, nutrient deficiencies, etc.

Referring to FIG. 1, an illustrative weed detection and spot spraying system 100 is depicted. In accordance with an illustrative example, the system 100 includes a camera 102 and a set of nozzles 104a, 104b, 104c and 104d having laterally overlapping spray fields 106a, 106b, 106c and 106d within a field of view 108 of the camera 102. By way of example, dimensions of each one of the spray fields is the area of ground covered over time as the spray nozzle travels along a line defined by a path of a pulled/pushed/mounted/self-propelled crop-field spraying implement upon which a corresponding spray nozzle is mounted. While not shown in the drawing, it will be understood that each of the nozzles 104a-d is coupled to a tank containing a fluid (e.g., herbicide, liquid fertilizer, pesticide etc.) that is applied to a field in accordance with activation signals issued on an individual basis by a processor 110.

In the illustrative example, the camera 102 is a high-definition RGB digital camera (e.g., 12 Mpixels). However, any of a number of camera types and quantities are contemplated, including multi-spectral cameras and multiple cameras mounted upon a spray boom assembly. The digital camera 102 is coupled via data bus 109 to the processor 110 and a memory 112 for storage and processing of each acquired image in accordance with the machine learning-based image field classification arrangement carried out by a neural network that is described further herein below.

Additionally, a display device (not shown in FIG. 1) may be coupled to, and receive, the processor 110. The display device presents captured/categorized images to an operator/farmer, thereby enabling a farmer to review and confirm accuracy of the machine learning-trained neural network in categorizing received images that may/may not include a weed. In addition to reviewing captured/categorized images, a graphical user interface of the display device supports entry of annotations by a user/farmer to identify and correct erroneously classified captured images. In an exemplary scenario, the processor 110 is configured to pass any classified image having an accompanying uncertainty below a threshold value (e.g. 85%) to a designated review buffer for further review and confirmation by the user/reviewer/farmer. The resulting reviewed/confirmed-classified images are, in an exemplary system, passed to a centralized (networked) machine learning training facility (see FIG. 4, described herein below).

In operation, the camera 102 generates a full image data for a crop floor within the field of view 108 that includes sub-fields 108a, 108b, 108c and 108d (depicted in FIG. 2a) corresponding to the laterally overlapping spray fields 106a, 106b, 106c and 106d of the set of nozzles 104a, 104b, 104c and 104d. The digital camera 102 acquires full image data (corresponding to the field of view 108) that is thereafter transferred to and processed by the processor 110 and memory 112, in accordance with a description of illustrative examples herein. More particularly, the processor 110 extracts/normalizes, from the full image data of a portion of a crop floor corresponding to the field of view 108, sub-field image data corresponding to each of the four sub-fields 108a-d in accordance with FIGS. 2a and 2b described herein below.

Figure 2A:
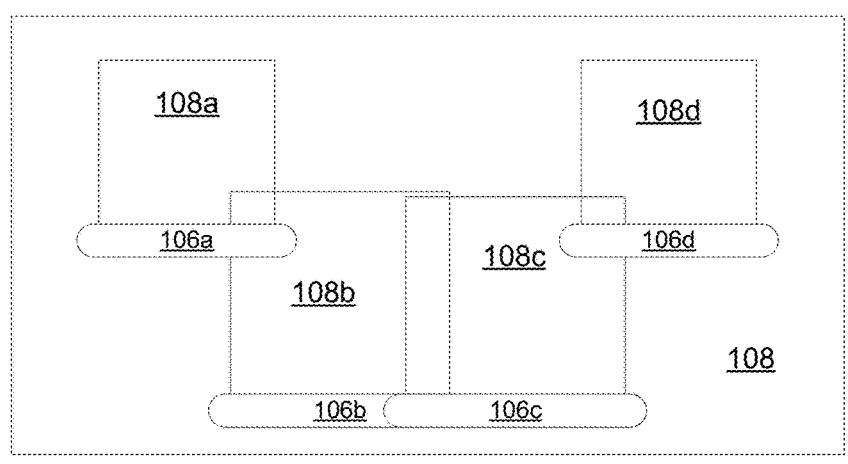
FIGS. 2a and 2b illustrative depict a field of view and sub-fields extracted therefrom for performing a machine learning-based classification on sub-field images extracted and normalized therefrom in accordance with the disclosure.
Figure 2B:
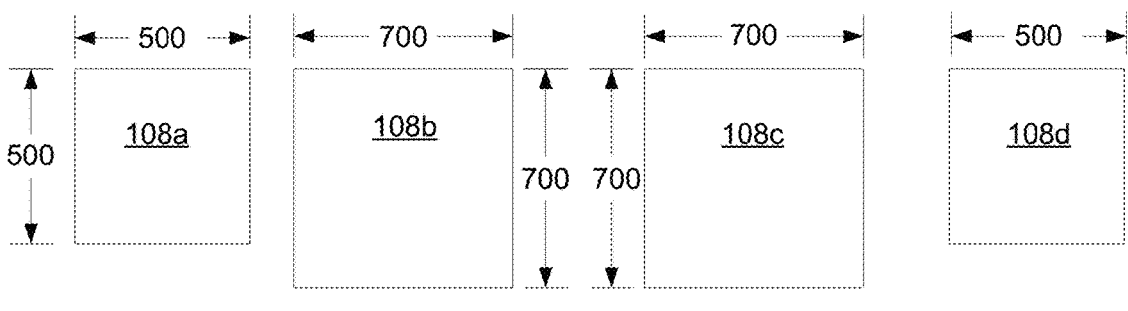

Turning briefly to FIG. 2a, an exemplary field of view 108 image is presented with overlays corresponding to the spray fields 106a, 106b, 106c and 106d—noting specifically that the spray field overlays are scaled in accordance with the magnification effect of near and far sub-fields of the overall camera view field 108. Importantly, a set of four sub-images (corresponding to sub-fields 108a, 108b, 108c and 108d), substantially corresponding to as least a width dimension of the spray fields 106a, 106b, 106c and 106d, are extracted from each full image (corresponding to the field of view 108) acquired by the camera 102. In the illustrative example, the subfields 108a-d are rectangular in shape. However, the subfields 108a-d may have different shapes in accordance with other implementations of the present disclosure (e.g., trapezoidal shape in accordance with optical distortion of crop field images by a forward-viewing camera lens). In the illustrative example, the camera 102 captures a "forward-looking" view of a crop field prior to the crop field passing beneath spray fields 106a-d of nozzles 104a-d. Consequently, a sub-field image width (in pixels) corresponding to one of the outer spray nozzles (e.g. nozzle 104a) is smaller (in captured camera image pixels) than a sub-field image width (in pixels) corresponding to one of the inner nozzles (e.g. nozzle 104b). By way of example, the field of view 108 image has dimensions of 1080×1920 pixels. As shown in FIG. 2b, the extracted sub-fields 108a and 108d have dimensions of 500×500 pixels, and the extracted sub-fields 108b and 108c have dimensions of 700×700 pixels—even though the spray fields of each the nozzles 104a-d have a same width. In the case of a forward-looking camera lens, the far field captures a greater actual width, and therefore an input sub-field corresponding to a physical rectangle is represented by a trapezoid in the capture camera image. As such, the rectangular pixel images in FIG. 2b represent the graphical morphing of a trapezoidal image sub-field (with the far edge being smaller than a near edge) into a rectangle/square image of the type shown in FIG. 2B—referred to herein as "rectangularization" of the trapezoidal raw sub-field images. Such image transformation is an example of the more generalized operation of "image rectification" involving perspective transformation. Such transformation is also referred to as "inverse perspective mapping" (IPM), which produces a "birds-eye" (direct overhead—as shown in FIG. 2a) view from a relatively front-facing perspective (108 as shown in FIG. 1)

In accordance with an illustrative example, the processor 110 (after performing the rectangularization of the raw sub-field images) reduces/normalizes the raw extracted pixel image data corresponding to the sub-fields 108a, 108b, 108c and 108d to 200×200 pixel images. The manner of reducing the pixel image dimensions from the raw input image dimensions (500×500, 700×700) can be performed in any of a variety of ways, including mapping pixels to nearest corresponding pixels on the reduced image grid, and discarding pixel data for pixels that are not closest to a given grid point in the reduced (200×200) pixel image position map.

The processor 110 thereafter performs a whole-image classification on each sub-field image data instance based upon a previously trained neural network to render a classification on each sub-field image. The operation of the processor 110, carrying out an input image classification operation on each of the rendered/normalized (200×200 pixel) images, is described herein below with reference to particular illustrative examples.

Figure 3A:
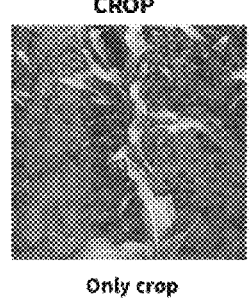
FIGS. 3a, 3b and 3c depict images corresponding to "crop", "crop and weed" and "no crop" classifications, respectively in accordance with the disclosure.
Figure 3B:
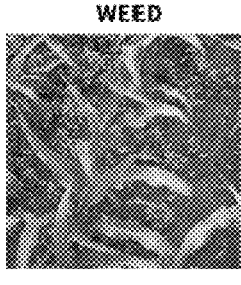
Figure 3C:
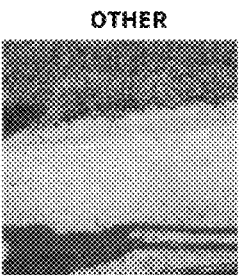

In accordance with an illustrative example, the whole-image classification output of the trained neural network of the processor 110 is, for each processed sub-field image, a simple classification of the processed sub-field image data instance. In a simplest machine learning-based trained neural network scenario, the output classification value for each processed sub-field image is simply one of two values. A first value ("spray") corresponds to "a weed is present in the image", and a second value ("don't spray") corresponds to "a weed is not present in the image." However, in more complex (yet still relatively simple) classification arrangements, the neural network is trained to detect when a crop plant is present within a field of view, and only activate spraying when both a crop plant and a weed are within the sub-field image. Such arrangement gives rise to at least a third classification "no crop present"—where a weed may be present, but the spray is not activated because no crop plant is present. Each of the three different "classes" are illustratively depicted in the three images of FIGS. 3a, 3b and 3c that depict images corresponding to "crop", "crop and weed" and "no crop" classifications, respectively.

Figure 4:
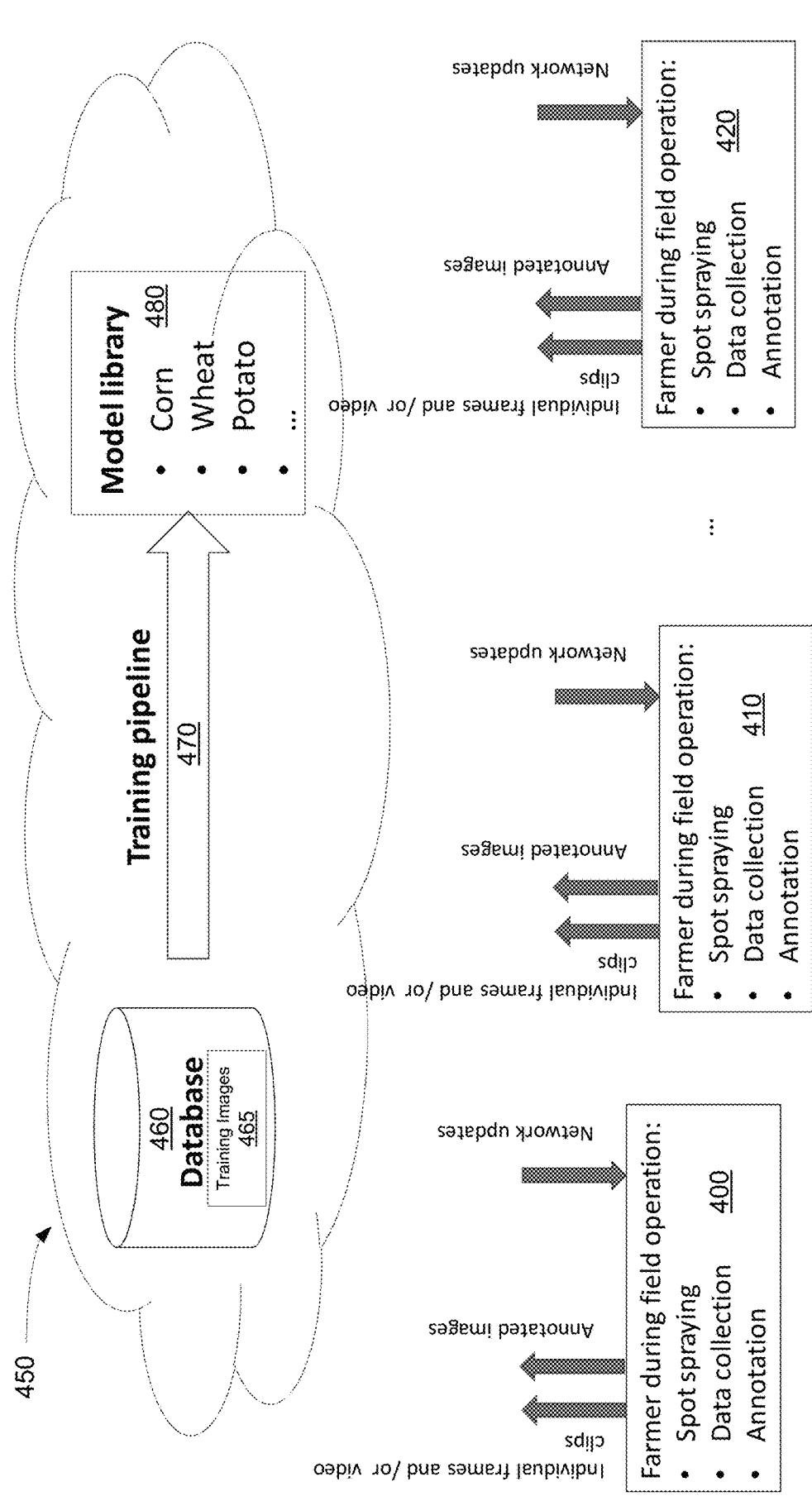
FIG. 4 provides a schematic view of a collaborative machine learning environment in accordance with the disclosure.

Turning to FIG. 4, an illustrative networked arrangement is depicted for implementing a collaborative machine learning arrangement wherein a population of individual users cooperatively provide additional sub-field images and corresponding classifications. Such additional images may arise from individuals auditing, post-spraying, a sequence of captured sub-field images and corresponding classifications assigned by the neural network. If the neural network rendered an erroneous classification, then an auditor/reviewer of previously classified image, within the population of individual users, provides for each erroneously classified sub-field image, (by way of example) the following: a copy of the sub-field (or whole) image data, an erroneous classification rendered by the neural network, and (optionally) a correct classification (proposed by the user). Additionally, multiple whole image frames are also saved—constituting the whole image containing the erroneously classified sub-field image as well as whole images before/after the erroneously classified sub-field image. In the illustrative example of FIG. 4, a first farmer 400, a second farmer 410, and a third farmer 420 each operate an instance of the system depicted in FIG. 1. The identified farmers represent a population of thousands of farmers operating the system depicted in FIG. 1. Each of the farmers 400, 410 and 420 operates their respective systems to carry out spot spraying in accordance with a local instance of a neural network configured in accordance with a global training carried out at a centralized neural network training facility 450.

In accordance with the illustrative example, the facility 450 includes a database 460 including millions of captured sub-field images making up a training image set 465. The training image set 465 is provided to a model training pipeline 470. The output of the model training pipeline 470 is a trained model 480 containing a neural network configuration for neural network instances incorporated into the individual automated spot weed spraying systems of the farmers 400, 410 and 420. As shown in the illustrative example, the trained model output from the model training pipeline 470, which is stored in a trained model configuration library 480, is characterized for a particular type of crop (e.g., wheat, corn, potato, soybean, etc.) or any other appropriate grouping for classification of received image sets. Creation of distinct neural network configurations for particular crops (or any other distinguishing characteristic such as soil type), if sufficiently populated by training images, may improve robustness of the resulting neural network classifications rendered, in operation, by instances of the system 100 operated by the farmers 400, 410 and 420. It is specifically noted that robust machine learning-based training is performed to render a "foundation model" that is used to configure neural networks to classify input images from a variety of crop fields having a wide variety of crops, soil types/conditions, etc.). Rendering the foundation model is aided by a multi-dimensional map (database) configured to maintain a geographical record of sources of training images (and environmental parameters describing characteristics of a crop field under which training sub-field images, corresponding to stored training instances, were acquired).

The output of the machine learning system stage carried out by the model training pipeline 470, in the form of the trained model 480, in addition to providing a current output characterization parameter value (or set of values). Thus, in accordance with illustrative examples, the model training pipeline 470 incorporates and utilizes an initial training configuration of the machine learning system stage. Such training includes, for example, configuring the trained model 480 (e.g. setting weights and/or coefficients of neural network nodes and layers) using an initial training set of images having known classifications. The initial configuration of the trained model 480 continues, on an iterative basis, until the configuration renders a set of differences between generated and expected outputs that fall within a specified minimum difference threshold. The specified minimum difference threshold may be specified on an individual difference and/or aggregated total difference (delta) basis on the known output points provided by the training set. Thereafter, the configuration may be updated based upon additional training points or a different set of difference thresholds based upon specific needs and/or experience using the initial/current configuration of the machine learning stage. In accordance with the illustrative example of FIG. 4, such updating of initially provided classification models is facilitated by annotated results of a currently existing version of the trained model 480 currently installed/executed on the systems of the farmers 400, 410 and 420.

As such, the illustrative example provided in FIG. 4 is a supervised, dynamically configured (via user/farmer-provided feedback) machine learning system. More particularly, in the above illustrative example, each processor 110 operating within instances of the system 100 operated by individual farmers incorporates a neural network. However, a vast variety of alternative machine learning architectures/types are contemplated, including: support vector machines, linear regression, logistic regression, naive Bayes, linear discriminant analysis, decision trees, k-nearest neighbor algorithm, and similarity learning, as well as self-supervised methods such as contrastive learning methods.

Figure 5:
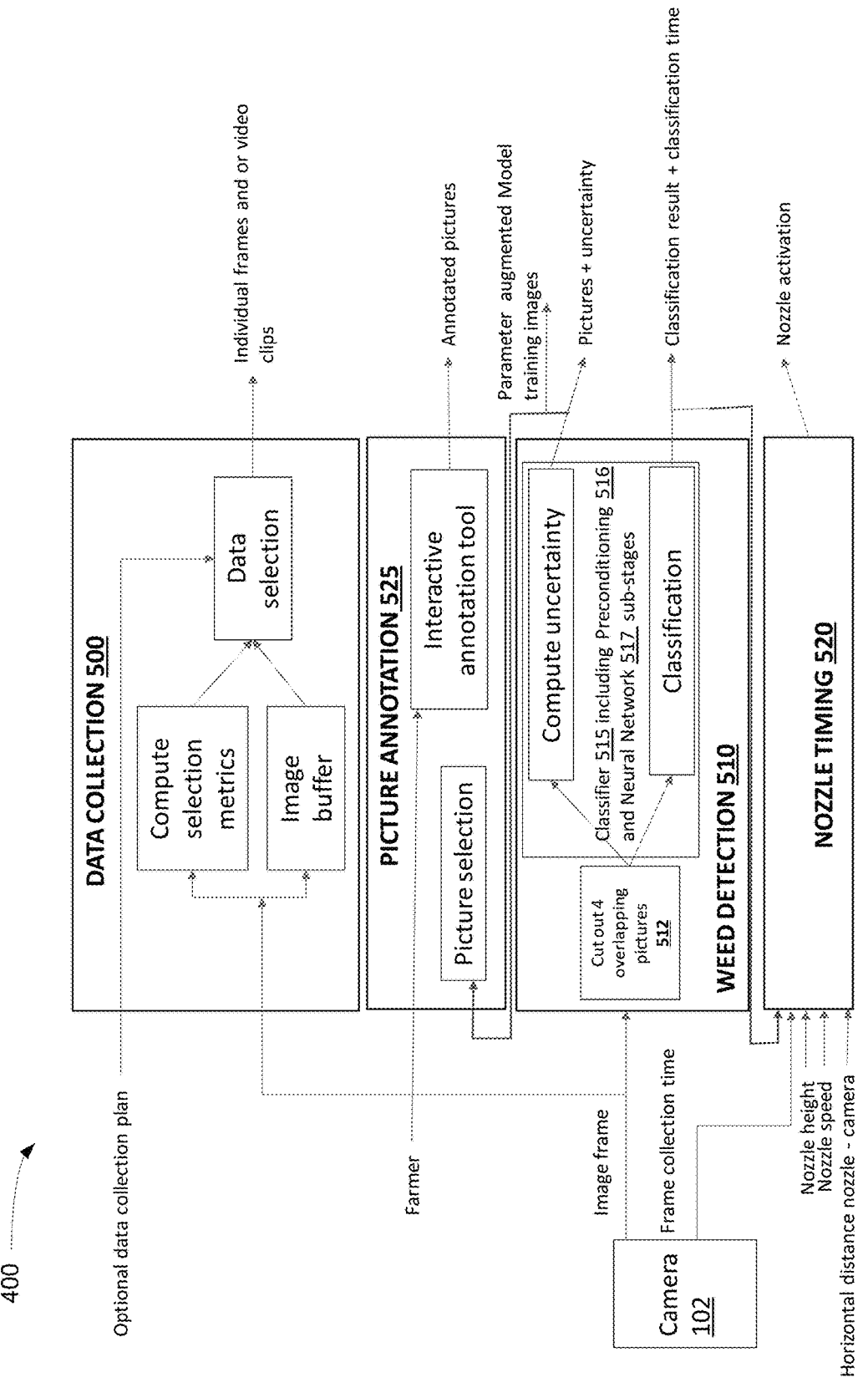
FIG. 5 is a schematic diagram of an exemplary implementation of a machine learning-based image classification for guiding spot weeding in accordance with the disclosure.

Turning now to FIG. 5, an exemplary data/decision flow is summarized in accordance with a detailed description of the structure and operation of the system 100 corresponding to one of the farmer-operated systems (e.g. farmer 400 system). In accordance with the illustrative example, the system includes a data collection aspect 500 that comprises pixel image data sets corresponding to the full field of view 108 of the camera 102. In accordance with the illustrative example, the captured pixel image data set is forwarded to a machine learning-based trained image classifier sub-system 510.

A sub-field image extraction stage 512, of the classifier sub-system 510, extracts sub-field image instances (which may overlap other sub-field image instances in accordance with a spray field nozzle coverage of each spray nozzle corresponding to one of the sub-field image instances) from a received instance of the pixel image data sets corresponding to the full field of view 108, where each sub-field image corresponds to an area of coverage of a corresponding spray nozzle for applying herbicide to a weed—or generally any applied fluid (e.g. pesticide, fertilizer, etc.) treating a characterized field of view of a field crop. Thereafter, each resulting sub-field image is presented to a machine learning-trained image classifier stage 515 of the classifier subsystem 510.

The classifier stage 515, containing the configured/trained neural network, thereafter renders a classification ("spray" or "no spray") and associated uncertainty score for the provided sub-field image instance corresponding to a particular area of a field over which a corresponding activated spray nozzle disperses herbicide during a particular activated time period that may be determined by an image/spray activation synchronization subsystem 520 (described herein below).

In accordance with an illustrative example, the classifier stage 515 includes a preconditioning component 516 that carries out digital data processing on (e.g. filters, parameterizes, etc.) a received input sub-field image instance rendered by the sub-field image extraction stage 512. In accordance with an illustrative example, the preconditioning component 516 renders an acquired data in a form suitable for further processing by a machine learning trained neural network stage 517. In a simplest form, such preconditioning may simply be passing the sensor data in digitized form (but otherwise unmodified) to a storage for subsequent processing by the machine learning trained neural network stage 517. Preconditioning performed by the preconditioning component 516 may be a simple arithmetic operation applied to each value (multiplying each pixel value by a scalar value) or it could be a complicated algorithm based on multiple sensor data values or even on previously-acquired image data. For instance, one may precondition an image by averaging it with several previously-acquired images. Yet another example of preconditioning is performing a Fourier transform on the image data to render received time domain data in the frequency domain. There may be more than one preconditioning steps applied to image data instances acquired over time.

The output of the preconditioning component 516 is provided in a pre-established form to the machine learning trained neural network stage 517. By way of a specific example, the camera 102 may render sub-images having six million pixels (or two million pixels), but the neural network stage 517 is trained on and operates on images of lesser quantity pixels (e.g., one million pixels, 500 thousand pixels, 40 thousand pixels, etc.). In such case, the preconditioning component 516 down-samples the data set to meet the 1 million pixel constraint of the neural network stage 517.

The machine learning trained neural network stage 517, in a particular example, comprises an artificial neural network (e.g., a convolutional neural network). The artificial neural network comprises a collection of configurable/tunable processing layers (with each layer including a set of computational nodes). The neural network incorporates/embodies a set of algorithms designed to perform a whole-image classification operation on a set of input parameters corresponding to pre-conditioned output from the preconditioning component 516. By way of example, the data input of the machine learning trained neural network stage 517 is an array of inputs having dimensions (length×width×3) corresponding to color (red, green, and blue) pixels of the normalized color (red, green, and blue) input sub-field image to be classified.

The output of the neural network stage 517 of the classifier stage 515 includes a set of outputs that issue a value for each input digital image. More specifically, each output of the set of outputs corresponds to a particular one of the set of distinct classifications. Moreover, in the illustrative example, the classification of a particular classified input sub-field image is set according to a one of the classification-specific outputs having a highest value. Additionally, the combination of output values is analyzed by the neural network to render a confidence value for the determined classification. The confidence value represents a degree of certainty of the "winning" classification output of the set of classification-specific outputs of the neural network. For example, in a simple two-classification output arrangement, a classification output set has individual output corresponding to "spray" and "don't spray". A certainty value corresponding to the classification rendered by the classification output value set is based upon, for example, the relative (or absolute) magnitudes of the values for the classification output set issued by the neural network.

By way of example, the neural network stage 517 comprises a combination of computational elements and data structures organized as: an input layer, multiple internal/hidden layers, and an output layer. The output from the preconditioning component 516 provides at least a portion of an informational content of the input layer. The topology of the neural network stage 517 of the classifier stage 515 includes a number of internal layers as well as a quantity of computational nodes within each internal layer and inter-layer connectivity between nodes of adjacent layers of the artificial neural network. By way of example, during the training of the neural network stage 517, configuration of the machine learning stage comprises specifying a set of coefficients (weights) for each of the internal layers of the artificial neural network. More particularly, each layer is filled by a weighted combination of the elements in the previous layer. A nonlinear activation function is applied to the resultant value in each node to determine an output value to be passed to the next layer.

Within the layers of the artificial neural network of the neural network stage 517, elements of the previous layer are, by way of example, combined in a weighted fashion. The output value for each element is then a non-linear operation acting on that combination. As will be readily appreciated by those familiar with artificial neural network topologies, each internal layer comprises a set of nodes, where each node receives a weighted contribution from each node of a previous layer and provides a weighted output (specified on a per-node basis) to each node at a next internal layer of the artificial neural network. A non-linear operation is performed within each node on the received weighted inputs from the previous layer.

A set of weight values 518 provide a configuration of the nodes of the neural network of the neural network stage 517. In particular, the values in each layer of the above-described artificial neural network are provided by the weight values 518. Each of the individual values of the weight values 518 are established during training of the classifier stage 515 using a set of input sub-field images and corresponding proper classifications (spray/don't spray).

An important aspect of operation of the image classifier stage 515 (more particularly the neural network stage 517) is a training process. Training comprises determining the weight values for the neural network stage 517 of the image classifier stage 515. As with the operational case, the output classification values are rendered by the neural network stage 517 for a series of preconditioned data. But in this case, each output classification value is accompanied by a label comprising one or more parameters associated with the classification value. Since the proper weights are not yet known, an initial starting guess is used. During training, the weights are adjusted until the calculated classifications rendered by the neural network stage 517 accurately track the actual (observed) classifications for input sub-field images—i.e. the neural network stage 517 is operating within a prescribed performance envelope. Retraining is also performed for any of a variety of reasons. Data collected in the storage (e.g., erroneously classified sub-field images submitted by farmer/users) may be used as labeled data to refine the operation of the neural network stage 517.

In accordance with an illustrative example, re-training/ updating of trained spray image classification models is carried out by annotated (classified) verified classified images provided during operation of the individual systems by farmers (e.g., farmers 400, 410, 420, etc). By way of a particular example, during operation of the system 100 by the farmer 400, for any sub-field image for which a rendered classification does not meet a pre-set certainty value threshold, the sub-field image is stored in a review buffer for review/confirmation of a classification assigned to the sub-field image by either direct/automated transmission by the classifier stage 515 transmitting to the cloud-based training facility 450, or alternatively/additionally by operation of a picture annotation subsystem 525 under instruction by a user/observer/farmer. The confirmed classification for the particular sub-field image is used for supplementing the machine learning-trained classification model (at the cloud-based training facility 450 described herein above.

Turning to the synchronization subsystem 520, by way of example, a variety of operating parameters are applied to render a spray activation timing for a particular sub-field image having a "spray" classification rendered by the classifier stage 515 during real-time operation of the system 100. Examples of operating parameters used by the synchronization subsystem include, but are not limited to, machine travel speed, nozzle height, linear distance between nozzle spray field and field position corresponding to a classified image, etc.

Moreover, in accordance with the disclosure herein, the annotation subsystem 525 is provided for a user to audit classifications assigned by the classifier subsystem 510 to sub-field image instances. The user may, using editing facilities of the annotation subsystem 525, retrieve sub-field images and corresponding classifications, edit/correct the assigned classifications for particular images, and thereafter report the corrections to a centralized training facility of the type proposed/described in association with FIG. 4.

In summary of the disclosure herein, a number of technical problems and corresponding solutions are provided herein that result in an improved weed spot-spraying arrangement based upon real-time classification of sub-field images, by a machine learning-based trained (neural network) processor, as either having or not having a weed therein, where the sub-field image substantially coincides with a lateral (width) dimension of a corresponding spray nozzle configured to selectively activate to disperse a herbicide upon detected weeds in a spot spraying operation.

As shown in the disclosure herein, a robustly trained system is highly advantageous. To that end, in accordance with the disclosure, annotating training images (providing classifications) is a very straight-forward task that simply involves a user assigning a classification value to each training instance.

In an exemplary scenario, a farmer is able to quickly audit (and annotate with correct classifications) a large number of captured sub-field images. The annotated sub-field images are thereafter used, in a collaborative training environment, to improve the classification model carried out by a neural network-based processor using an updated classification model.

Another technical challenge involves ensuring that a spray nozzle is correctly activated to spray an area of a crop field corresponding to a sub-field image classified as having a weed. The present disclosure presents a relatively straight-forward solution where a nozzle is activated prior to the nozzle passing over an area of the crop field of interest, and thereafter maintaining the nozzle in an activated state (spraying herbicide) for a time duration that ensures the portion of the field of interest has been sprayed. In that regard, the time duration may be lengthened/shortened in accordance with a detected travel speed of the nozzle along the field. Importantly, instead of exact localization of the weeds (within a camera field of view), the disclosed system merely classifies an entire sub-field of view corresponding to a spray field width (side-to-side across a crop floor) perpendicular to a direction of travel of the spray nozzle. Moreover, the camera 102 is mounted upon a same boom as the spray nozzles 104a-d to ensure that the camera 102 field of view adjusts with changes in the orientation of the boom to which the spray nozzles 104a-d are mounted. The boom may be oriented horizontally with respect to the ground, or alternatively the boom may be oriented perpendicularly to the ground.

Moreover, overlapping sub-field images, as with the overlapping of spray fields 106a-d of the spray nozzles 104a-d, ensures that if one nozzle misses a weed (e.g. due to high cross-wind), the weed is treated by a neighboring nozzle. Moreover, if one sub-field image is wrongly classified, the weed may still be detected by another laterally positioned sub-field image on the same image. Moreover, several images are captured by the system for any given area over which the system 100 passes. Thus, several opportunities arise for detecting a weed as the weed is depicted in multiple serially acquired images as the system 100 progresses along a field crop line.

Yet another challenge is the need to provide a robust model for classifying a wide variety of weed images in various crop and soil environments. To that end, instead of training the neural network during the development phase, train and update it continuously. Improve the network by collecting interesting images during the field operation of the farmer. Such acquisition of further training images and corresponding classifications is managed through targeted updates guided by included metadata characterizing the conditions/environment under which the training instances were acquired. Such metadata may including any of the following types: geographical location, date, weather (lighting), climate, soil condition/color, type of soil etc. The metadata facilitates building a robust model by ensuring adding/including classified training images by retraining for characteristics/conditions for which training of the model was not previously performed.

In determining where/when to acquire additional training images, a variety of input data sources may be used including: yield maps, fertilizer maps, soil maps etc. Moreover, metadata based on weather forecasts and models to predict where specific rare conditions may arise may also be used. A central management facility may thereafter create an image collection plan and send the plan to a particular sprayer when the farmer starts spot-spray treating the crop field. The acquisition of new classification data sets is implemented in an automated management system to rapidly, without user intervention, acquire the new training images and thereafter deploy updated models for neural network configurations carried out the processors 110. By way of example, indicating problems (e.g., mis-classification) of the neural network configuration can be sent to the central management facility in accordance with the illustrative example provided in FIG. 4. The model is updated and an updated neural network configuration is downloaded via a network connection to the farmer's processor 110.

While the above-discussion has been directed to classifying a subfield that may or may not have a weed therein, the disclosed arrangement may alternatively be trained to classify a subfield image as being diseased/not diseased based upon a machine learning-trained neural network processing of the subfield image.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for carrying out spot-based weed spraying based upon a classification value rendered from a sub-field image in accordance with a machine learning-based trained model applied by a processor to the sub-field image, the method comprising:

acquiring, by a camera, a full field of view image of a crop floor;

extracting, from the full field of view image, a sub-field image corresponding to a spray nozzle positioned to provide a spray field extending over a part of the crop floor depicted in the sub-field image;

rendering, by the processor in accordance with the machine learning-based trained model, a classification for the sub-field image; and selectively activating the spray nozzle in accordance with the classification for the sub-field image, wherein the rendering is carried out by a neural network incorporated into the processor, and wherein the neural network has an array of inputs arranged in accordance with pixel dimensions of the sub-field image corresponding to a spray nozzle positioned to provide a spray field.

2. The method of claim 1, wherein the neural network has a quantity of outputs corresponding to a set of potential classifications for the sub-field image.

3. The method of claim 1, wherein the method is carried out on a system including a plurality of spray nozzles having overlapping spray fields between two adjacent ones of the plurality of spray nozzles.

4. The method of claim 1, wherein the camera is mounted upon a same physical mounting structure as the spray nozzle.

5. The method of claim 1, wherein the sub-field image is rectangular shaped.

6. A method for carrying out spot-based weed spraying based upon a classification value rendered from a sub-field image in accordance with a machine learning-based trained model applied by a processor to the sub-field image, the method comprising:

acquiring, by a camera, a full field of view image of a crop floor;

extracting, from the full field of view image, a sub-field image corresponding to a spray nozzle positioned to provide a spray field extending over a part of the crop floor depicted in the sub-field image;

rendering, by the processor in accordance with the machine learning-based trained model, a classification for the sub-field image; and selectively activating the spray nozzle in accordance with the classification for the sub-field image, wherein the sub-field image is a rectangle rendered from an initial trapezoid image sub-field captured by a forward-looking camera.

7. The method of claim 1, wherein the selectively activating the spray nozzle comprises leaving an activated spray nozzle in an on state for a period of time that relates to a speed with which the spay nozzle travels along a line.

8. The method of claim 1, further comprising adapting an on-time of the spray nozzle in accordance with a machine speed.

9. The method of claim 1, further comprising providing a sample sub-field image and a corresponding verified classification for the sample-subfield image to a training facility for the machine learning-based trained model.

10. The method of claim 9, wherein the sample sub-field image is provided in real-time during the spot spraying operation.

11. The method of claim 10, wherein the providing the sample sub-field image to a reviewer for verification of an assigned classification is performed on an automated basis.

12. The method of claim 11, wherein the automated basis comprises applying a confidence value for the classification of the sample sub-field image to a threshold confidence value.

13. The method of claim 1, wherein the rendering is performed in a cloud-based server system.

14. The method of claim 1, wherein the method further comprises providing the rendered classification and associated sub-field image to a reviewer for annotation.

15. The method of claim 1, wherein the rendering is carried out in accordance with a foundation model.

16. The method of claim 15, wherein the foundation model is provided with an associated training coverage map indicating an extent of training images of particular types for which machine leaning training has been performed.

17. A weed spot-spraying system configured to carry out a spot-based weed spraying method based upon a classification value rendered from a sub-field image in accordance with a machine learning-based trained model applied by a processor to the sub-field image, comprising:

a camera;

a spray nozzle assembly including a spray nozzle; and a processor;

wherein the spot-based weed spraying method comprises:

acquiring, by the camera, a full field of view image of a crop floor;

extracting, from the full field of view image, a sub-field image corresponding to the spray nozzle positioned to provide a spray field extending over a part of the crop floor depicted in the sub-field image;

rendering, by the processor in accordance with the machine learning-based trained model, a classification for the sub-field image; and selectively activating the spray nozzle in accordance with the classification for the sub-field image, wherein the rendering is carried out by a neural network incorporated into the processor, and wherein the neural network has an array of inputs arranged in accordance with pixel dimensions of the sub-field image corresponding to a spray nozzle positioned to provide a spray field.

18. The weed spot-spraying system of claim 17, wherein the system further comprises a network communication interface configured to communicate with a networked facility to provide training messages comprising:

a sub-field image instance;

metadata describing an environment within which the sub-field image instance was acquired by the camera, and a confirmed characterization of the sub-field image.

19. The weed spot-spraying system of claim 18, wherein the neural network has a quantity of outputs corresponding to a set of potential classifications for the sub-field image.

20. A weed spot-spraying system configured to carry out a spot-based weed spraying method based upon a classification value rendered from a sub-field image in accordance with a machine learning-based trained model applied by a processor to the sub-field image, comprising:

a camera;

a spray nozzle assembly including a spray nozzle; and a processor;

wherein the spot-based weed spraying method comprises:

acquiring, by the camera, a full field of view image of a crop floor;

extracting, from the full field of view image, a sub-field image corresponding to the spray nozzle positioned to provide a spray field extending over a part of the crop floor depicted in the sub-field image;

rendering, by the processor in accordance with the machine learning-based trained model, a classification for the sub-field image; and selectively activating the spray nozzle in accordance with the classification for the sub-field image, wherein the sub-field image is a rectangle rendered from an initial trapezoid image sub-field captured by a forward-looking camera.

\* \* \* \* \*